Patented Oct. 7, 1930

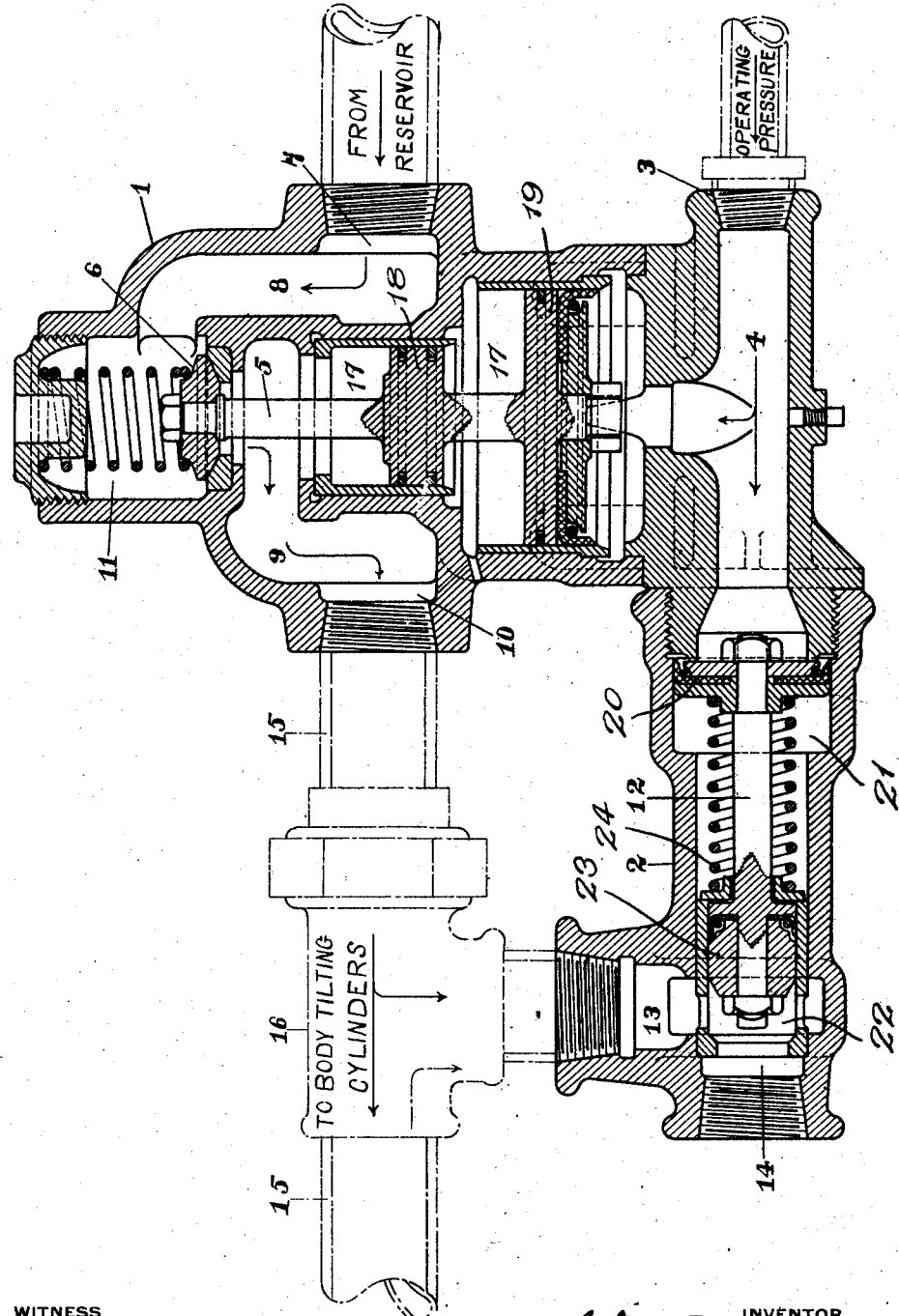

1,777,821

UNITED STATES PATENT OFFICE

JOHN P. ANDERSON, OF KOPPEL, PENNSYLVANIA, ASSIGNOR, BY MESNE ASSIGNMENTS, TO PRESSED STEEL CAR COMPANY, OF PITTSBURGH, PENNSYLVANIA, A CORPORATION OF NEW JERSEY

PRESSURE CONTROL AND EXHAUST VALVE FOR FLUID-PRESSURE-OPERATED RAILWAY DUMP CARS

Application filed November 23, 1927. Serial No. 235,218.

My invention relates to pressure operated valves and especially to such a valve in combination with a fluid pressure operated dump car having body tilting cylinders, a pressure reservoir and an operating pressure line which may be connected at its ends to similar cars to form a train of such dump cars. A car embodying such a pressure operating system is fully described in an application filed by me jointly with Alfred C. Schmohl Ser. No. 244,877, filed Jan. 6, 1928.

An object of my invention is to provide a pressure operated railway dump car with a pressure operated valve for supplying pressure from the pressure reservoir to operate the car body tilting mechanism and to automatically exhaust the pressure from said mechanism after the body has been dumped.

Referring to the drawing, the figure is a section through the valve and exhaust chamber with required pressure connections to the reservoir and to the body tilting cylinders.

Reference character 1 indicates the valve casing having a member 2 attached thereto. Within the casing is a fluid pressure distribution chamber, an operating chamber 4 and a differential piston chamber 17 connecting the operating and distribution chambers. The distribution chamber comprises a receiving chamber 8, a discharging chamber 9 and a port connecting the chambers. A differential piston in said piston chamber has the smaller head 18 adjacent the chamber 9 and the larger head 19 adjacent the chamber 4. A valve stem 5 rising out of the piston head 18 has mounted thereon a valve 6 which is normally seated in the port between the chambers 8 and 9. A spring member 11 between the valve 6 and casing 1 insures seating of the valve 6. Within the member 2 is a piston chamber 21 opening into the chamber 4 of the casing and an exhaust chamber 22. A piston 20 in the chamber 21 has attached thereto a valve stem 12 upon which is mounted a valve 23 which is seated in the exhaust chamber. Ports in the exhaust chamber are connected with openings 13 and 14 of the member 2 and the valve 22 is normally free of said ports. Encircling the valve stem 12 is a spring 24 which resists movement of the piston 20 and insures the movement of the piston when the pressure is reduced in the chamber 4 so as to insure the opening of the exhaust ports.

The operation of the control valve in connection with a pressure actuated mechanism is as follows: the chamber 8 is connected through the inlet 7 to a pressure reservoir, the chamber 9 through the outlet 10 to a line 15 extending to the mechanism, the chamber 4 to an operating fluid pressure line and the inlet 13 is connected through a T 16 to the line 15. The opening 14 of the member 2 is normally open to the atmosphere. Fluid pressure when admitted to the chamber 4 moves the pistons 19 and 20 to close the ports in the exhaust chamber and open the valve 6 allowing the fluid under pressure in the reservoir to flow into the line 15 and operate the mechanism. When the valve 6 is open the piston is in a forward position in the chamber 17, from that shown in the drawing, and the pressure in the chamber 9 bears on the piston 18 during the time the fluid is flowing from the reservoir to the mechanism. At such time when the pressure of the fluid in the operating line is reduced and the pressure on the piston 19 is less than on the piston 18, the pistons 18 and 19 move downwardly closing the valve 6 and cutting off pressure to the mechanism. If the fluid pressure remaining in the chamber 4 is less than the tension in the spring 24, the piston 20 in the member 2 moves toward the chamber 4 to the position shown in the drawings and opens the ports in the exhaust chamber allowing the pressure in the mechanism to exhaust through the openings 13 and 14 to the atmosphere. The arrangement of the connection of the exhaust line of the mechanism may be modified by connecting to the opening 14 and using the opening 13 as the exhaust opening. In this way the pressure of the exhausting fluid could be used to assist in moving the valve 23 to open the exhaust ports. The relation of the size of the piston on the valve stem 12 to the valve seated in the port 14 could be so proportioned that a sufficient reduction in pressure in the operating chamber 4 that would allow the piston of the valve 5 to move downwardly and cut off pressure from the reservoir would not be great enough to cause the exhaust valve piston to move. The pressure in the body tilting cylinders could be held therein until such time as the pressure in the chamber 4 was further reduced to allow the exhaust chamber piston to move inwardly and open the exhaust outlet port 13.

Having thus described the invention what I claim as new and desire to secure by Letters Patent is:

1. In a valve for controlling the supply of fluid pressure to a pressure actuated mechanism the combination of a fluid distribution chamber in the casing of said valve, a fluid exhaust chamber in a member mounted on said casing, a valve operating chamber in said casing, pistons mounted in said casing and member and seating against the pressure in said operating chamber, means mounted in said distribution and exhaust chamber, for regulating the flow of fluid therein and controlled by said pistons.

2. The combination, in a fluid pressure operated control valve casing, of a fluid distribution chamber, an operating chamber, a piston chamber containing a differential piston and connecting said distribution and operating chambers, means mounted in said distribution chamber and controlled by said piston for regulating the flow of fluid in said chamber, a member mounted on said casing, an exhaust chamber and a piston chamber within said member, a piston in said member piston chamber and controlled from said operating chamber, ports in said exhaust chamber and means in said exhaust chamber controlled by said member piston for opening and closing said ports, said pistons being actuated by variations in the piston pressure in said distribution and operating chambers and resilient means in said member resisting movement of its piston, in one direction.

3. The combination, in a fluid pressure operated control valve casing, of a fluid distribution chamber, an operating pressure chamber, a piston chamber containing a differential piston and connecting said distribution and operating chamber, means mounted in said distribution chamber and controlled by said piston for regulating the flow of fluid in said chamber, a member mounted on said casing, an exhaust chamber and a piston chamber within said member, a piston in said member piston chamber and controlled from said operating chamber, ports in said exhaust chamber and means in said exhaust chamber controlled by said member piston for opening and closing said ports, said pistons being actuated by variations in the piston pressure in said distribution and operating chambers.

4. The combination with a pressure operated control valve for selectively admitting pressure to a pressure actuated mechanism, of a member mounted on said casing and actuated by said pressure to prevent exhausting of the pressure from the mechanism when said control valve is open and to exhaust pressure from said mechanism when said control valve is closed and resilient means mounted in said member resisting the closing of the exhaust ports of said member.

5. The combination in a fluid pressure operated control valve casing, of a fluid distribution chamber, an operating chamber, a piston chamber containing a differential piston and connecting said distribution and operating chambers, means mounted in said distribution chamber and controlled by said piston for regulating the flow of fluid in said chamber, a member mounted on said casing, an exhaust chamber and a piston chamber within said member, a piston in said member piston chamber and controlled from said operating chamber, ports in said exhaust chamber and means in said exhaust chamber controlled by said member piston for opening and closing said ports, said pistons being actuated by variations in the piston pressure in said distribution and operating chambers, said member piston being forced into exhaust position by exhausting pressure in the exhaust chamber.

In testimony whereof I affix my signature.

JOHN P. ANDERSON.